Aug. 21, 1934.  G. A. TISSIER  1,971,085
SUSPENSION OF THE SEATS OF VEHICLES
Filed June 6, 1932
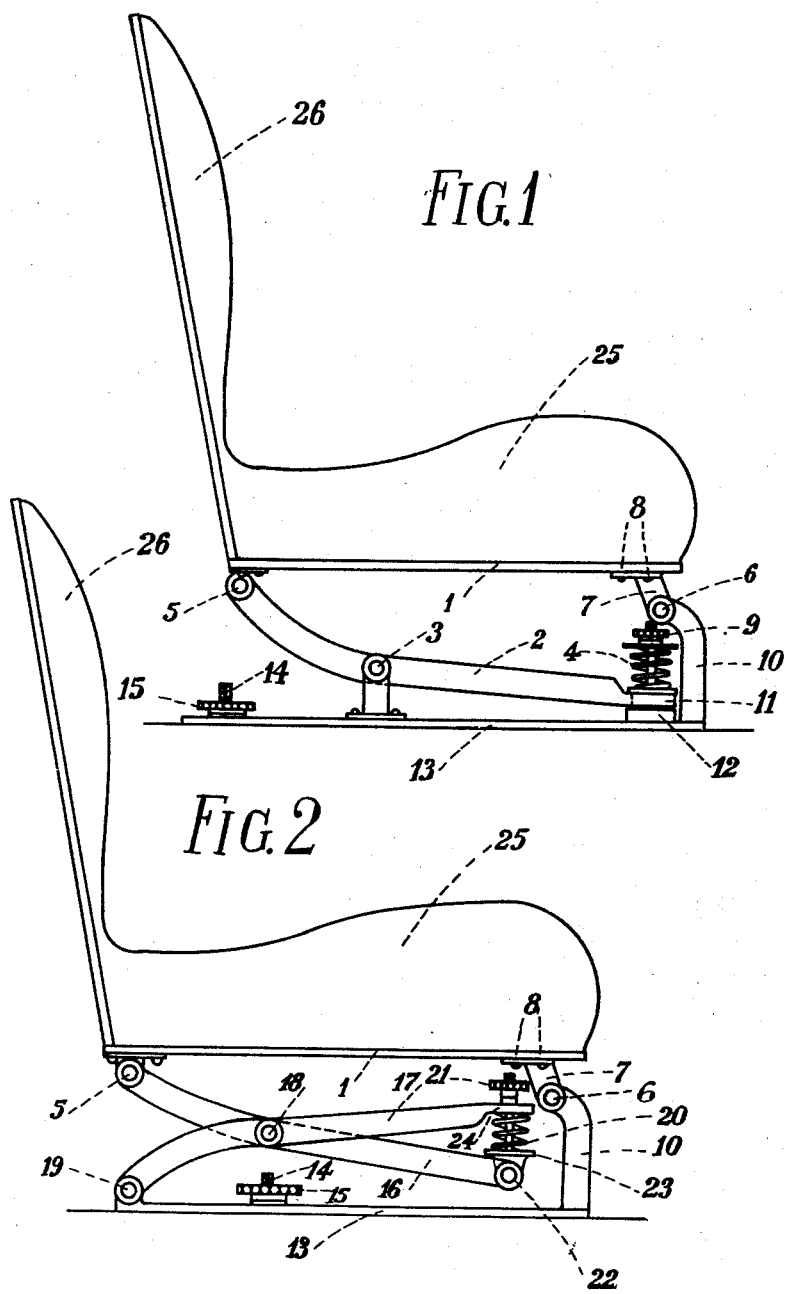

Patented Aug. 21, 1934

1,971,085

UNITED STATES PATENT OFFICE 1,971,085

SUSPENSION OF THE SEATS OF VEHICLES

Guy Albert Tissier, Paris, France, assignor to Société d'Exploitation des Brevets Lecocq & Tissier, Paris, France, a corporation of France Application June 6, 1932, Serial No. 615,727
In France February 10, 1932

2 Claims. (Cl. 155—55)

The present invention relates to improvements in the suspension of the seats of vehicles of any kind whatever, such as automobile vehicles. The suspension arrangement according to the present invention practically eliminates any transmission of the shocks imparted to the vehicle to the passengers. According to the invention, the front edge of the seat is pivoted about a horizontal axis. The rear part of the seat is elastically suspended, for instance by being jointed to one or more levers, or to a system of levers the displacements of which are limited by suitable springs. The seat according to the present invention is therefore given a rotary movement about its axis of articulation which is located on the front edge of the seat, that rotary movement taking place along a circular arc, the radius of which is equal to the longitudinal width of the seat. A system of springs of suitable strength is adapted to check these rotary displacements of the seat through a lever or a system of levers jointed to the rear edge of the seat. Said springs should preferably be adjustable.

Preferred embodiments of my invention will be hereinafter described with reference to the accompanying drawing, given merely by way of example, and in which:

Fig. 1 is a side elevational view of one embodiment of the invention;

Fig. 2 is a similar view corresponding to another embodiment of the invention.

In the embodiment of Fig. 1, 1 shows a seat for a vehicle of any type whatever, and 13 is the floor on which said seat is to be mounted. Seat 1 may be given any suitable shape whatever. In the example shown in the drawing, the seat consists of a kind of chair, 25 being the seat proper and 26 being the back of the chair. The front edge of seat 1 is provided with a plurality of lugs 7, which are secured to the seat in any suitable manner, for instance by means of rivets 8. A spindle 6 carried by a support 10 fixed to the floor 13 of the vehicle passes through said lugs. The seat is therefore allowed to rotate about spindle 6. On the other hand, a suitable number of levers 2 are jointed to the rear edge of the seat. Said levers are adapted to rotate, on the one hand about points 5, with respect to the seat, and on the other hand, about points 3, with respect to the floor 13 of the vehicle. The front end of each lever 2 is flattened, as shown at 11. A compression spring 4 is located above the end 11 of each lever 2, and the strength of that spring can be adjusted by means of a milled nut 9. Thus, under the action of a shock, the whole seat is caused to rotate about spindle 6, and that rotary movement is braked by springs 4, which exert their action through the medium of levers 2. The whole of the device, instead of being directly fixed to the floor of the vehicle, may be secured to a plate 13 which is fixed to the floor for instance by means of bolts 14 and nuts 15.

It will readily be understood that when the vehicle is subjected to a shock, the rear part of the seat tends to rotate about spindle 6 in a downward direction, the front end of each lever 2 is therefore caused to rotate in an upward direction, and its movement is elastically limited by spring 4. The distance between the end 11 of lever 2 and fulcrum 3 must be chosen substantially greater than the distance between fulcrum 3 and point 5 so that an appreciable displacement of end 11 of the lever will correspond to a very small displacement of the rear part of the seat, the forces applied at 11 and 5 respectively being, on the contrary, smaller at 11 than at 5.

In the embodiment shown in Fig. 2, I have shown at 1 the seat and at 13 the floor of the vehicle or the supporting plate secured to the floor in the same manner as in the embodiment of Fig. 1. I have also shown at 7 the lugs secured to the front edge of the seat, at 6 the lugs about which said spindle are pivoted, and at 10 the support of said spindle. In this embodiment, levers 2 are replaced by pivoted levers 16—17. The branch 16 of said levers is pivoted at 5 to the rear part of the seat, as in the case of Fig. 1. But, instead of being pivoted to the floor as in the preceding embodiment, lever 16 is pivoted at 18 to a second lever 17 which is pivoted to the floor at 19. Between the free ends of said levers, there is interposed a spring 20, which bears, at one end on the extremity 24 of lever 17, and, at the other end, against a support 23 pivoted at 22 to the end of lever 16. The compressive force of spring 20 can be adjusted by means of nut 21.

It will readily be understood that the operation of the embodiment corresponding to Fig. 2 is quite similar to that of the embodiment above described with reference to Fig. 1.

It should be well understood that the preceding embodiments of my invention are merely disclosed by way of example, and that other systems of levers could be imagined, which would give the same results without departing from the principle of my invention. Likewise, the term "spring" is to be understood in its broadest meaning, including any elastic device for checking the displacements of the seat. In a general way, I do not wish to be limited to the specific embodiments which have been above described, as there might be changes made in the arrangement, disposition and form of the parts without departing from the principle of my invention as comprehended within the scope of the appended claims.

What I claim is:

1. A suspension device for seats of vehicles which comprises in combination, a support fixed to the floor of the vehicle, means for pivotally articulating the front edge of said seat to said support about a horizontal axis, a lever jointed to the rear edge of the seat and extending below said seat toward the front thereof, a support rigidly fixed to the floor of the vehicle and pivotally supporting said lever at an intermediate point thereof located at a smaller distance from the rear end of said lever than from the front end thereof, the front end of said lever being ring-shaped, a rod fixed to the floor and extending throughout said ring shaped end, a nut screwed on the upper end of said rod, and a spring interposed between said ring shaped end and said nut, for limiting the upward displacements of the front end of said lever.

2. A suspension device for seats of vehicles which comprises in combination, a support fixed to the floor of the vehicle, means for pivotally articulating the front edge of said seat to said support about a horizontal axis, a lever jointed to the rear edge of said seat and extending below said seat toward the front thereof, a second lever jointed both to the floor of the vehicle under the rear part of the seat and to the first mentioned lever at an intermediate point thereof located at a smaller distance from the rear end of the first mentioned lever than from the front end thereof, and elastic means interposed between the front ends of both levers.

GUY ALBERT TISSIER.